(12) United States Patent
Zhang

(10) Patent No.: US 8,880,423 B2
(45) Date of Patent: Nov. 4, 2014

(54) INVENTORY ESTIMATION FOR SEARCH RETARGETING

(75) Inventor: Qiong (James) Zhang, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 393 days.

(21) Appl. No.: 13/175,270

(22) Filed: Jul. 1, 2011

(65) Prior Publication Data

US 2013/0006764 A1 Jan. 3, 2013

(51) Int. Cl.
*G06Q 30/00* (2012.01)
*G06Q 30/02* (2012.01)

(52) U.S. Cl.
CPC ............ *G06Q 30/0254* (2013.01); *G06Q 30/02* (2013.01)
USPC ....................................... 705/14.52

(58) Field of Classification Search
CPC ................................. G06Q 30/0254
USPC ....................................... 705/14.52
See application file for complete search history.

(56) References Cited

U.S. PATENT DOCUMENTS

| | | | |
|---|---|---|---|
| 6,285,999 B1 * | 9/2001 | Page | 1/1 |
| 7,283,992 B2 * | 10/2007 | Liu et al. | 1/1 |
| 7,529,741 B2 * | 5/2009 | Aravamudan et al. | 1/1 |
| 2010/0082401 A1 | 4/2010 | Vee et al. | |
| 2010/0100407 A1 | 4/2010 | Lin et al. | |
| 2010/0100414 A1 | 4/2010 | Lin et al. | |
| 2010/0106556 A1 | 4/2010 | Vee et al. | |
| 2010/0114647 A1 | 5/2010 | Chu et al. | |
| 2010/0114710 A1 | 5/2010 | Agarwal et al. | |
| 2010/0161408 A1 | 6/2010 | Karson et al. | |
| 2010/0169328 A1 * | 7/2010 | Hangartner | 707/751 |
| 2011/0015992 A1 * | 1/2011 | Liffiton et al. | 705/14.46 |
| 2011/0029377 A1 | 2/2011 | Chen et al. | |
| 2011/0119136 A1 | 5/2011 | Eldreth et al. | |

OTHER PUBLICATIONS

Yang, Jian et al., "Inventory Allocation for Online Graphical Display Advertising", Yahoo! Labs, Technical Report YL-2010-004, (Aug. 20, 2010), 27 pages.

* cited by examiner

*Primary Examiner* — James W Myhre
(74) *Attorney, Agent, or Firm* — Brinks Gilson & Lione

(57) ABSTRACT

Techniques for estimating advertisement inventory for search retargeting segments are provided. A total inventory for each cluster of a plurality of clusters is estimated based on a history of previously viewed pages and previously used search keywords that were submitted by users is searches performed prior to accessing the previously viewed pages. A search retargeting (SRT) segment is received that includes a set of search keywords. The SRT segment is received in a request for deliverable advertisement inventory for advertisements associated with the SRT segment. A deliverable inventory for the received SRT segment is estimated based on the estimated total inventories for the clusters.

17 Claims, 6 Drawing Sheets

900

1000

INVENTORY ESTIMATION FOR SEARCH RETARGETING

BACKGROUND OF THE INVENTION

1. Field of the Invention

The present invention relates to online advertising, and in particular, to search retargeting.

2. Background Art

A search engine is an information retrieval system used to locate documents and other information stored on a computer system. Search engines are useful at reducing an amount of time required to find information. One well known type of search engine is a Web search engine which searches for documents, such as web pages, on the "World Wide Web." Examples of such search engines include Yahoo! Search™ (at http://www.yahoo.com), Bing™ (at http://www.bing.com), and Google™ (at http://www.google.com). Online services such as LexisNexis™ and Westlaw™ also enable users to search for documents provided by their respective services, including articles and court opinions. Further types of search engines include personal search engines, mobile search engines, and enterprise search engines that search on intranets, among others.

To perform a search, a user of a search engine supplies a query to the search engine. The query contains one or more words/terms, such as "hazardous waste" or "country music." The terms of the query are typically selected by the user to as an attempt find particular information of interest to the user. The search engine returns a list of documents relevant to the query. In a Web-based search, the search engine typically returns a list of uniform resource locator (URL) addresses for the relevant documents, which is displayed to the user in a search results page. If the scope of the search resulting from a query is large, the returned list of documents may include thousands or even millions of documents.

"Sponsored search" refers to a form of Internet advertising/marketing that enables advertisers to increase their visibility in the results page of a search engine query. According to sponsored search, an advertiser may pay or provide other compensation for having an advertisement (or "ad") appear in a sponsored section of the results page for one or more particular queries. A user who enters one of the queries into the search engine is provided with a results page that includes the advertisement in the sponsored search section. The sponsored search section is prominently displayed in the results page, to enable the user to easily see and interact with the advertisement.

Display advertising is a form of online advertising where advertisements are displayed alongside online content on web pages. Display advertisements may be displayed in various forms, including in the form of banner ads, pop-up ads, etc. A particular display advertisement may be selected for display based on attributes of the user viewing a web page on which the display advertisement is to be displayed, such as the viewer's age, etc.

Advertisers frequently advertise products and/or services online in the form of an "advertising campaign." An advertising campaign typically includes a set of advertisements provided by an advertiser that share a theme to make up an integrated marketing communication. Advertisement serving systems enable advertisers to set up advertising campaigns to target particular advertisement impressions. Advertising campaigns are frequently configured to include advertisements to be displayed in the form of display advertising.

Search retargeting (SRT) is a form of online advertising where advertisements of advertising campaigns are displayed against user search histories in the form of display advertising. The purpose of SRT is to continue targeting users after they have performed searches and have viewed the resulting search results pages. After a user performs a search and views the search results, the user may browse additional web pages where display advertisements may be displayed. According to SRT, display advertisements may be selected for display to the user based on the search keywords entered by the user when the user was previously searching. If the search keywords used during the searching by the user match keywords provided by an advertiser, an advertisement of the advertiser may be selected for display to the user as a display ad.

An advertiser may submit a SRT segment that includes a set of keywords that may be used to match search keywords entered by users to cause an advertisement of the advertiser to be selected for display. The advertiser may desire to receive an estimate of advertisement inventory for their submitted SRT segment, which is an estimation of how many deliverable advertisements impressions are available for the set of keywords over some time period (e.g., daily, weekly, monthly, etc.). Based on the inventory estimation, the advertiser may modify the set of keywords of the SRT segment to better meet their campaign goals. However, inventory estimation for SRT is difficult because of its relationship to both sponsored search and display advertising.

BRIEF SUMMARY OF THE INVENTION

Techniques for estimating advertisement inventory for SRT segments are provided. A total inventory for each cluster of a plurality of clusters is estimated based on a history of previously viewed pages and previously used search keywords that were submitted by users prior to accessing the previously viewed pages. A SRT segment is received that includes a set of search keywords. The SRT segment is received in a request for an estimate of deliverable advertisement inventory for ads associated with the SRT segment. A deliverable inventory estimate for the received SRT segment is generated based on the estimated total inventories for the clusters, among other factors.

In one implementation, a method for estimating advertisement inventory is provided. A plurality of viewed pages is clustered into a plurality of clusters to generate a plurality of page view probability vectors that includes a page view probability vector for each viewed page. A plurality of search keywords is clustered into the plurality of clusters to generate a plurality of keyword probability vectors that includes a keyword probability vector for each search keyword. A plurality of total inventories is estimated that includes an estimated total inventory for each of the clusters.

Furthermore, a SRT segment may be received that includes a set of search keywords. A deliverable inventory for the segment is estimated. For instance, a deliverable inventory estimate for the segment may be separately determined for each cluster to generate a plurality of cluster-specific deliverable inventory estimates. The cluster-specific deliverable inventory estimates may be summed to provide the estimate of deliverable inventory for the segment.

In another implementation, a system for estimating advertisement inventory is provided. The system includes a cluster inventory estimator and a segment inventory estimator. The cluster inventory estimator estimates a total inventory for each cluster of a plurality of clusters. The segment inventory estimator receives a search retargeting segment that includes a set of search keywords, and estimates a deliverable inventory for the segment.

In one implementation, the cluster inventory estimator includes a cluster probability vector generator and a cluster total inventory estimator. The cluster probability vector generator is configured to cluster a plurality of viewed pages into the clusters to generate a plurality of page view probability vectors, and to cluster a plurality of search keywords into the clusters to generate a plurality of keyword probability vectors. The cluster total inventory estimator is configured to estimate a plurality of total inventories that includes an estimated total inventory for each cluster of the plurality of clusters.

The segment inventory estimator may include a cluster deliverable inventory estimator and a summer. The cluster deliverable inventory estimator determines a deliverable inventory estimate for the segment, for each cluster, to generate a plurality of cluster-specific deliverable inventory estimates. The summer sums the cluster-specific deliverable inventory estimates to generate the estimate of the deliverable inventory for the segment.

Computer program products are also described herein. The computer program products include a computer-readable medium having computer program logic recorded thereon for enabling inventory estimation for SRT, and that enables further embodiments as described herein.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
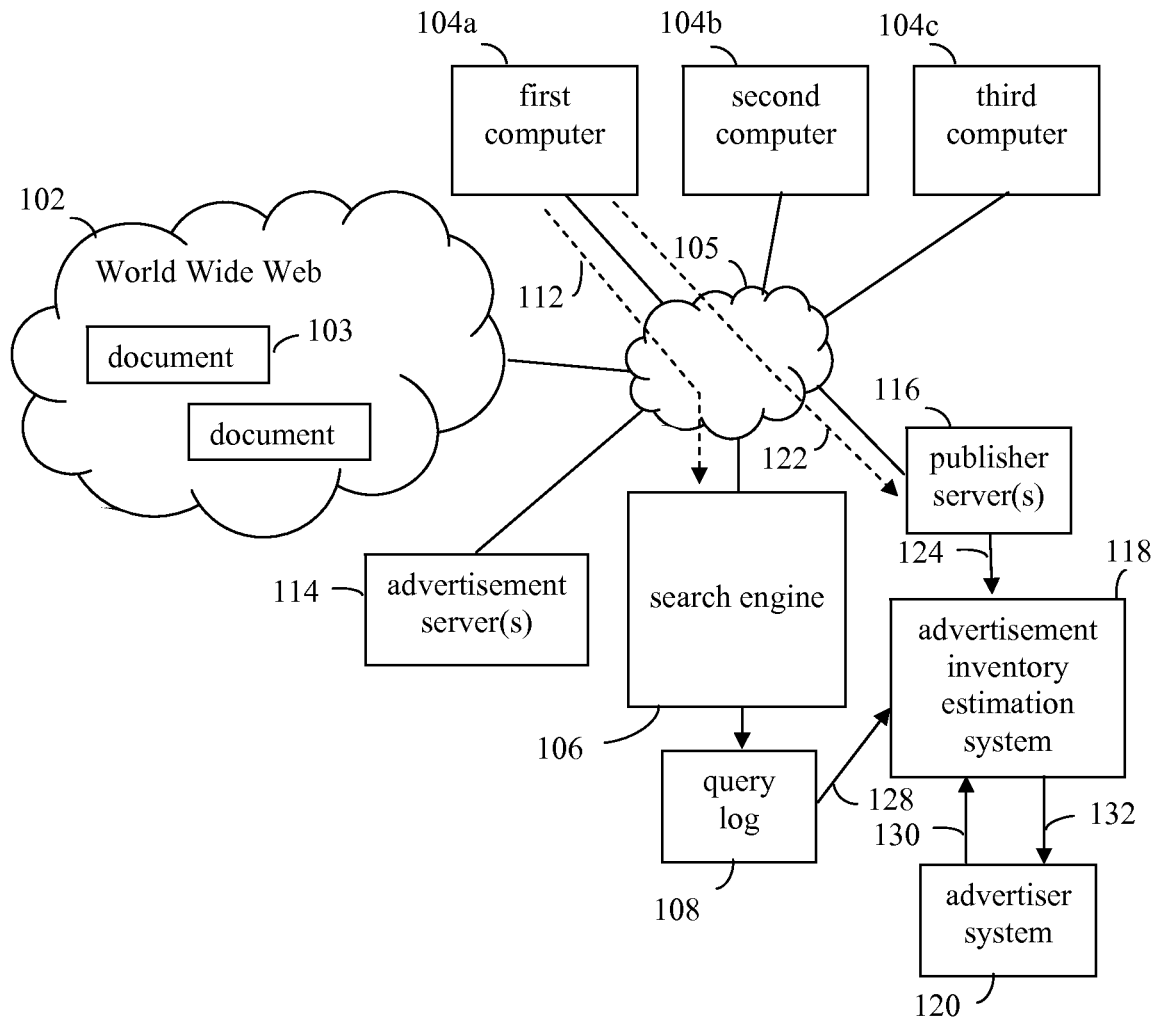
FIG. 1 shows a block diagram of an online searching, content viewing, and advertising system, according to an example embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Example Embodiments

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments enable the estimation of inventory in search retargeting (SRT) applications. Such embodiments may be implemented in various embodiments. For instance, FIG. 1 shows an example environment in which SRT inventory estimation may be implemented. FIG. 1 shows a block diagram of an online searching, content viewing, and advertising system 100, according to an example embodiment. System 100 is described as follows as an example environment for embodiments, but is not intended to be limiting.

As shown in FIG. 1, system 100 includes a search engine 106. One or more computers 104, such as first-third computers 104a-104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. Computers 104 may each be any type of suitable electronic device, typically having a display and having web browsing capability (or other suitable network communication functionality), including a desktop computer (e.g., a personal computer, etc.), a mobile computing device (e.g., a personal digital assistant (PDA), a laptop computer, a notebook computer, a tablet computer (e.g., an Apple iPad™), a netbook, etc.), a mobile phone (e.g., a cell phone, a smart phone, etc.), etc.

In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.documents.com/documentX, and/or by other mechanisms. Computers 104 can access document 103 through network 105 by supplying a URL corresponding to document 103 to a document server, such as publisher server 116. Any number of publisher servers 116 may be present in system 100 and coupled to network 105, including ones, tens, hundreds, thousands, etc.

As shown in FIG. 1, search engine 106 is coupled to network 105. Search engine 106 accesses a stored index that indexes documents, such as documents of World Wide Web 102. A user of computer 104a who desires to retrieve one or more documents relevant to a particular topic, but does not know the identifier/location of such a document, may submit a query 112 to search engine 106 through network 105. Search engine 106 receives query 112, and analyzes the index to find documents relevant to query 112. For example, search engine 106 may determine a set of documents indexed by the index that include terms, referred to herein as search keywords, of query 112. The set of documents may include any number of documents, including tens, hundreds, thousands, or even millions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

Search engine 106 may be implemented in hardware, software, firmware, or any combination thereof. For example, search engine 106 may include software/firmware that executes in one or more processors of one or more computer systems, such as one or more servers. Examples of search engine 106 that may be accessible through network 105 include, but are not limited to, Yahoo! Search™ (at http://www.yahoo.com), Bing™ (at http://www.bing.com), and Google™ (at http://www.google.com).

Figure 2:
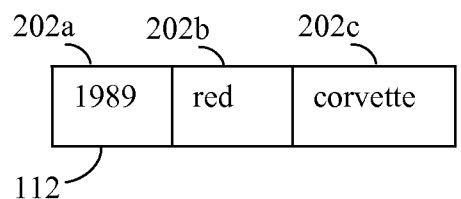
FIG. 2 shows an example query that may be submitted by a user to a search engine.

FIG. 2 shows an example search query 112 that may be submitted by a user of one of computers 104a-104c of FIG. 1 to search engine 106. Query 112 includes one or more search keywords 202, such as first, second, and third search keywords 202a-202c shown in FIG. 2. Any number of search keywords 202 may be present in a query. As shown in FIG. 2, search keywords 202a-202c of query 112 are "1989," "red," and "corvette." Search engine 106 applies these search keywords 202a-202c to index 114 to retrieve a document locator, such as a URL, for one or more indexed documents that match "1989," "red," and "corvette," and may order the list of documents according to a ranking. As shown in FIG. 1, search engine 106 may generate a query log 108. Query log 108 is a record of searches that are made using search engine 106, including the search keywords used during the searches.

"Sponsored search" refers to a form of Internet advertising/marketing that enables advertisers to increase their visibility in the results page of a search engine query. In sponsored search, an advertiser may pay or provide other consideration for having information, such as a link to a website of the advertiser, appear in a sponsored section of the results webpage for one or more particular queries. The sponsored section is prominently displayed in the results page, to enable the user to easily view and interact with the displayed information of the advertiser.

Display advertising is a form of online advertising where advertisements are displayed alongside online content on web pages. Display advertisements may be displayed in various forms, including in the form of banner ads, pop-up ads, etc. A particular display advertisement may be selected for display based on attributes of the user (e.g., age, geographic location, etc.) viewing a web page on which the display advertisement is to be displayed.

For example, as shown in FIG. 1, publisher server 116 may receive a document request 122 from first computer 104a. Document request 122 may identify the document in any manner, such as by a document address (e.g., URL). Publisher server 116 may serve the requested document to first computer 104a for display at first computer 104a in a browser. Furthermore, the served document may include one or more advertisement impressions, where display advertisements are to be displayed in the document by the browser. As such, based on the contents of the document, the browser may transmit a request to one or more advertisement servers, such advertisement server 114, to provide one or more advertisements (e.g., advertisement creatives) to be displayed in the document by the browser.

Advertisers frequently advertise products and/or services online in the form of an "advertising campaign." An advertising campaign typically includes a set of advertisements provided by an advertiser that share a theme to make up an integrated marketing communication. Advertisement serving systems enable advertisers to set up advertising campaigns to target particular advertisement impressions. Advertising campaigns are frequently configured to include advertisements to be displayed in the form of display advertising.

Search retargeting (SRT) is a form of online advertising where advertisements of advertising campaigns are displayed against user search histories in the form of display advertising. The purpose of SRT is to continue targeting users after they have performed searches and viewed the resulting search results pages. After a user performs a search, such as by submitting search query 112, and the user views the search results, the user may view additional web pages where display advertisements may be displayed, such as the document provided in response to document request 122. According to SRT, advertisements may be selected for display to the user based on the search keywords entered by the user when the user was previously searching. If search keywords used by the user match a set of keywords provided by an advertiser, an advertisement of the advertiser may be selected for display to the user.

An advertiser may submit a SRT segment that includes a set of keywords. When the search keywords of the SRT segment are matched by a user's search keywords, an advertisement of a corresponding advertising campaign of the advertiser may be selected to be displayed. The advertiser may desire to receive an estimate of advertisement inventory for their submitted SRT segment, which is an estimation of how many deliverable advertisements impressions are available for the set of keywords over some time period (e.g., daily, weekly, monthly, etc.). Based on the inventory estimation, the advertiser may decide to modify the set of keywords of the SRT segment to better meet their campaign goals.

For example, as shown in FIG. 1, system 100 includes an advertiser system 120 and an advertisement inventory estimation system 118. Advertiser system 120 is a system associated with an advertiser that may provide one or more advertisements included in an advertising campaign. The advertisements may be provided to advertisement server 114 to be provided in response to requests for advertisements to fulfill impressions in displayed documents. Advertisement inventory estimation system 118 is configured to generate estimates of available advertisement inventory in response to requests from advertisers or other entities. For instance, as shown in FIG. 1, advertiser system 120 may transmit a SRT segment 130 to advertisement inventory estimation system 118. SRT segment 130 includes a set of search keywords of interest to the advertiser with respect to an advertising campaign. In response to receiving SRT segment 130, advertisement inventory estimation system 118 may determine an estimate of deliverable advertisement inventory for the keywords of SRT segment 130, and may transmit a deliverable inventory estimate 132 to advertiser system 120, which is an estimate of deliverable inventory for SRT segment 130.

According to conventional techniques, it is difficult to estimate inventory for SRT because of its relationship to both sponsored search and display advertising. Inventory estimation for SRT is very different from estimating inventory for sponsored search related advertising campaigns. However, embodiments described herein overcome these difficulties. As shown in FIG. 1, advertisement inventory estimation system 118 receives previously submitted search keywords 128 from search engine 106 (e.g., from query log 108) and previously viewed page information 124 from publisher server 116. Advertisement inventory estimation system 118 uses this information regarding previously submitted search keywords and previously viewed pages to estimated deliverable inventory for SRT segment 130. According to embodiments, when performing SRT inventory estimation, advertisement inventory estimation system 118 considers search volumes associated with SRT segment 130, and estimates of a number of page view events from which advertisements can be served for SRT segment 130.

Figure 3:
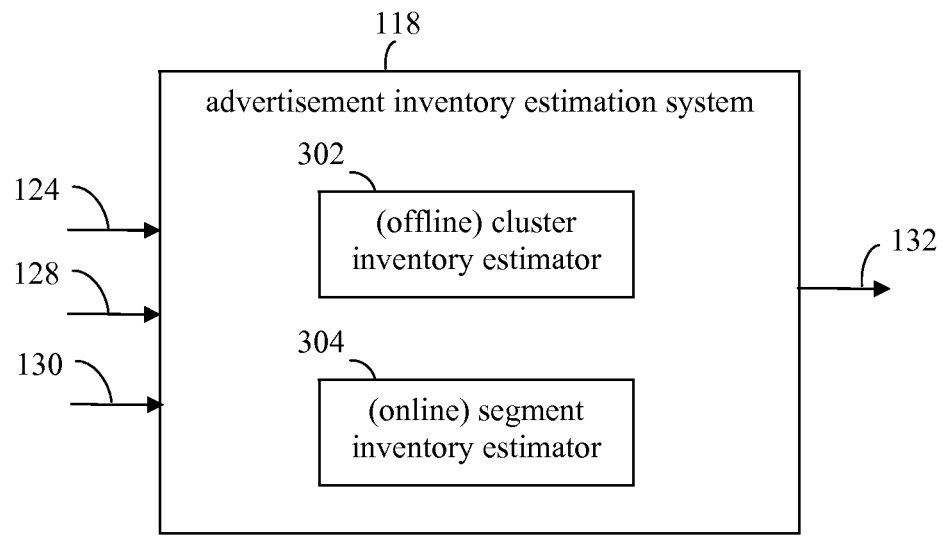
FIG. 3 shows a block diagram of an advertisement inventory estimation system, according to an example embodiment.

Advertisement inventory estimation system 118 may be configured in various ways to perform its functions. For instance, FIG. 3 shows a block diagram of advertisement inventory estimation system 118, according to an example embodiment. As shown in FIG. 3, advertisement inventory estimation system 118 includes a cluster inventory estimator 302 and a segment inventory estimator 304. Cluster inventory estimator 302 is configured to cluster search keywords and viewed pages, and to estimate a total advertisement inventory for each of the clusters (e.g., an estimate of all available advertisement impressions for each of the clusters). Segment inventory estimator 304 is configured to estimate a deliverable advertisement inventory for a SRT segment (e.g., an estimate of advertisement impressions that are available for the particular SRT segment search keywords, which is less than all available advertisement impressions) based on the clustered search keywords and viewed pages. Note that in an embodiment, as indicated in FIG. 3, cluster inventory estimator 302 may estimate the total advertisement inventory for each of the clusters in an offline fashion. As such, cluster inventory estimator 302 may perform its functions prior to receiving a request to perform inventory estimation for a SRT segment. However, in other embodiments, cluster inventory estimator 302 may perform its functions in an online manner. Furthermore, as indicated in FIG. 3, segment inventory estimator 304 may be configured to estimate a total deliverable advertisement inventory for a SRT segment in an online fashion (e.g., in real time) when a request to perform inventory estimation for a SRT segment is received.

Figure 4:
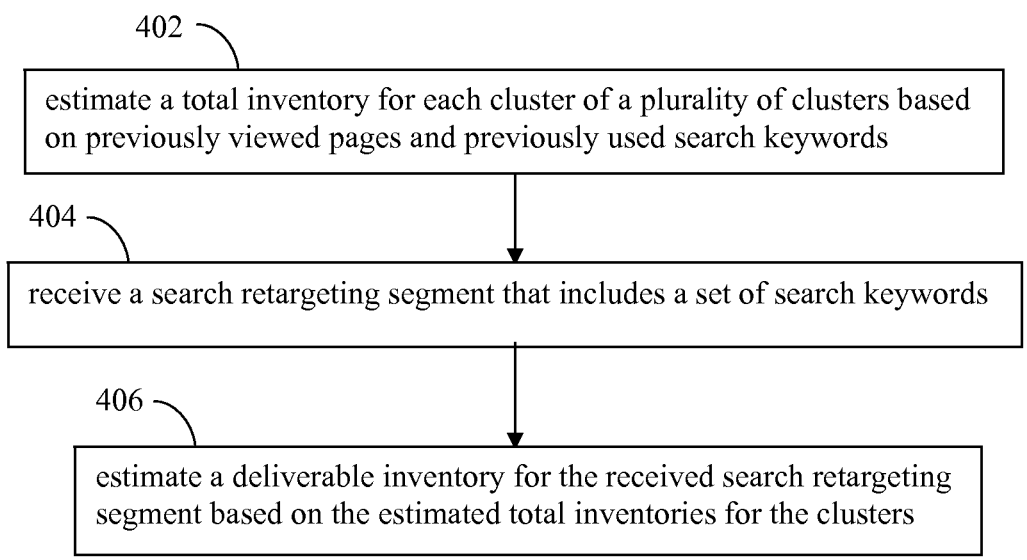
FIG. 4 shows a flowchart for performing advertisement inventory estimation for a search retargeting segment, according to an example embodiment.

In an embodiment, advertisement inventory estimation system 118 of FIG. 3 may operate according FIG. 4. FIG. 4 shows a flowchart 400 for performing advertisement inventory estimation for a search retargeting segment, according to an example embodiment. Further structural and operational embodiments will be apparent to persons skilled in the relevant art(s) based on the discussion regarding flowchart 400. Flowchart 400 is described as follows with respect to advertisement inventory estimation system 118 of FIG. 3, for illustrative purposes.

Flowchart 400 begins with step 402. In step 402, a total inventory is estimated for each cluster of a plurality of clusters based on previously viewed pages and previously used search keywords. For example, in an embodiment, cluster inventory estimator 302 may receive previously submitted search keywords 128 and previously viewed page information 124. Previously submitted search keywords 128 includes one or more search keywords that were previously submitted by one or more users in one more search queries to a search engine when performing a search. For instance, a user may have submitted "Sunnyvale soccer fields" when searching for soccer fields located in Sunnyvale, Calif. Previously submitted search keywords 128 may include a single search query (e.g., "Sunnyvale soccer fields"), or may include further search keywords provided in a series of searches provided by the user and/or other users. For instance, in one example provided for purposes of illustration, when looking into a beach vacation, the user may have input the following sequence of search queries:

Caribbean islands
beach vacation packages
Bermuda
. . .

This sequence of search queries may be included in previously submitted search keywords 128 for the user along with any search keywords input by the user, as well as further search keywords previously submitted by other users.

Note that previously submitted search keywords 128 may include further information associated with the search keywords. For instance, previously submitted search keywords 128 may include user identifiers with search keywords to indicate which user submitted each search keyword. Furthermore, or alternatively, previously submitted search keywords 128 may indicate a time (e.g., a time and date) when each search keyword was submitted by a user. For instance, previously submitted search keywords 128 may include the following information for the above examples of search queries:

| | |
|---|---|
| Sunnyvale soccer fields | 2:30:00 pm 6/15/11 |
| Caribbean islands | 5:34:14 pm 6/24/11 |
| beach vacation packages | 5:35:32 pm 6/24/11 |
| Bermuda | 5:40:42 pm 6/24/11 |
| . . . | |

As such, in this example, previously submitted search keywords 128 may include search keywords related to two separate search sessions of a user (e.g., a first search session directed to soccer, and a second search session directed to a beach vacation), which occurred on different days (e.g., 9 days apart).

Previously viewed page information 124 may include information indicating pages (e.g., web pages, etc.) previously viewed by users who submitted the search keywords of previously submitted search keywords 128 when the users were browsing web content (e.g., web pages, etc.) subsequent to performing the searches. Previously viewed page information 124 may list the previously viewed pages in any manner, including by page addresses, page identifiers, or other identifying mechanism for the viewed pages. As such, in an embodiment, search engine 106 and publisher server 116 of FIG. 1 may be owned and/or operated by a same entity and/or by related entities, such that it is possible to track search keywords entered by users during searches, and to associate the search keywords with pages that are later viewed by the same users.

In an embodiment, cluster inventory estimator 302 of FIG. 3 may be configured to estimate a total inventory for each cluster of a plurality of clusters (step 402 of FIG. 4) based on previously submitted search keywords 128 and previously viewed page information 124. In an embodiment, cluster inventory estimator 302 may be configured to co-cluster previously submitted search keywords 128 and viewed pages of previously viewed page information 124 into a number of implicit clusters. For instance, in an embodiment, cluster inventory estimator 302 may represent each viewed page as a vector of probabilities that indicates the probability of the viewed page belonging to each cluster. Furthermore, cluster inventory estimator 302 may represent each search keyword as a vector of probabilities that indicates the probability of the search keyword belonging to each cluster. Cluster inventory estimator 302 may use the probability vectors to estimate the total advertisement inventory for each implicit cluster. For instance, cluster inventory estimator 302 may use addition (summing) and/or other technique to estimate the total inventory for each cluster.

Referring back to FIG. 4, in step 404, a search retargeting segment is received that includes a set of search keywords. For example, as shown in FIG. 3, segment inventory estimator 304 may receive SRT segment 130 as a request to estimate a deliverable inventory for the set of keywords included in SRT segment 130. SRT segment 130 may include any number of search keywords, including ones, tens, hundreds, and even larger numbers of search keywords.

For instance, in one example provided for purposes of illustration, SRT segment 130 may include the following keywords related to a travel service:
beach
vacation
Caribbean
Jamaica
Bermuda
hotel
...

In step 406, a deliverable inventory is estimated for a received search retargeting segment based on the estimated total inventories for the clusters. For example, in an embodiment, segment inventory estimator 304 may estimate a deliverable inventory for SRT segment 130 based on the total advertisement inventories estimated for the implicit clusters by cluster inventory estimator 302. Segment inventory estimator 304 may generate deliverable inventory estimate 132, which includes the estimated deliverable inventory for SRT segment 130.

Cluster inventory estimator 302 and segment inventory estimator 304 may be configured in various ways to perform their functions. Example embodiments for cluster inventory estimator 302 and segment inventory estimator 304 are described in the following subsections.

A. Example Embodiments for Estimating Cluster Inventory

Figure 5:
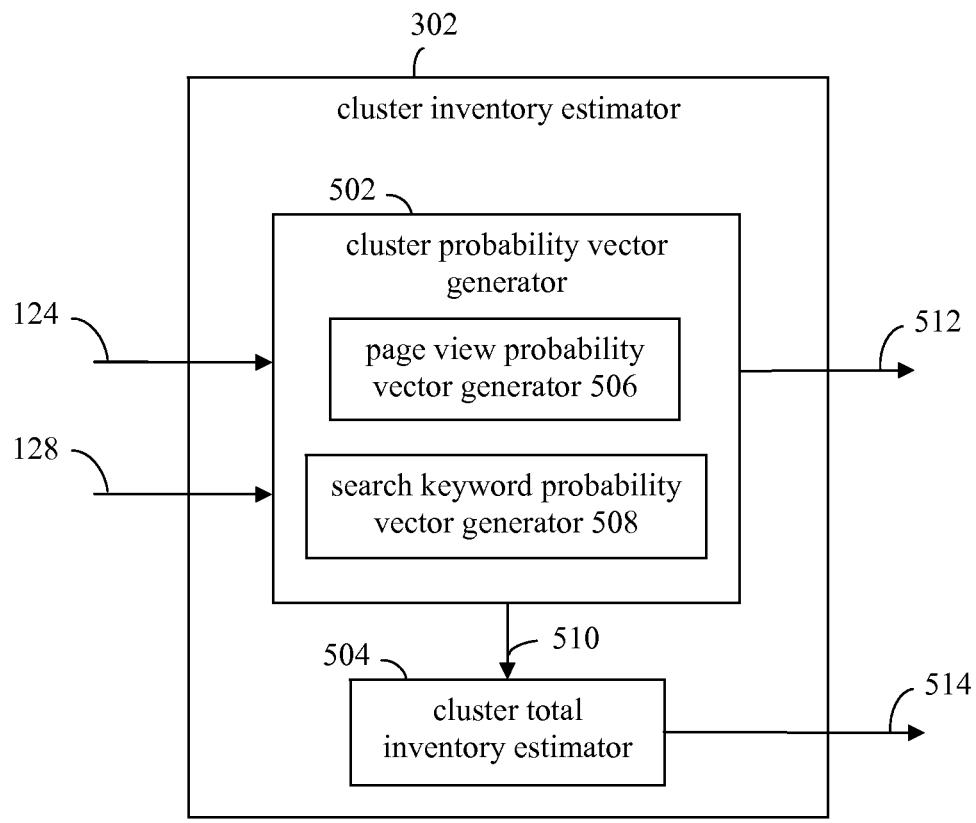
FIG. 5 shows a block diagram of a cluster inventory estimator, according to an example embodiment.
Figure 6:
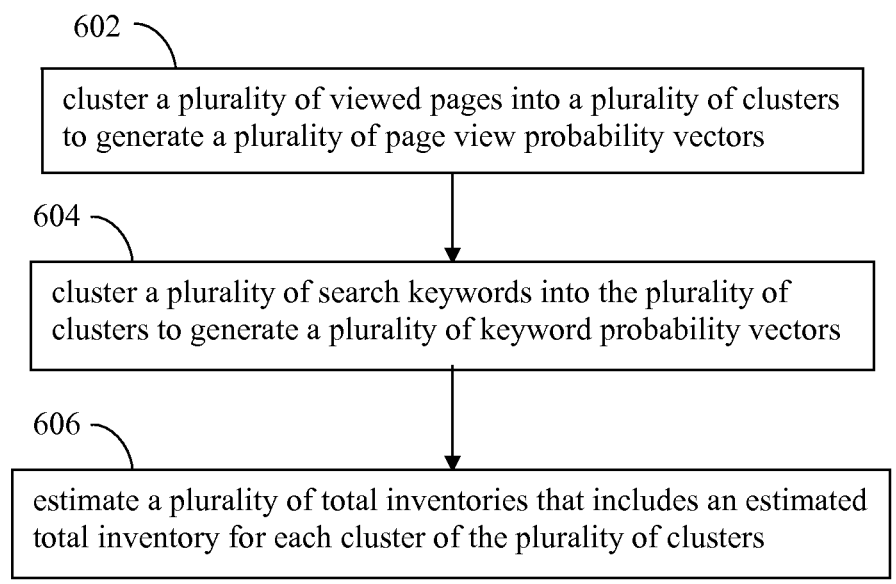
FIG. 6 shows a flowchart for estimating inventory for clusters, according to an example embodiment.

Cluster inventory estimator 302 may be configured in various ways to perform step 402 of FIG. 4. For instance, FIG. 5 shows a block diagram of cluster inventory estimator 302, according to an example embodiment. As shown in FIG. 5, cluster inventory estimator 302 includes a cluster probability vector generator 502 and a cluster total inventory estimator 504. Furthermore, cluster probability vector generator 502 includes a page view probability vector generator 506 and a search keyword probability vector generator 508. Cluster inventory estimator 302 of FIG. 5 is described as follows with respect to FIG. 6. FIG. 6 shows a flowchart 600 for estimating total advertisement inventory for clusters, according to an example embodiment. In an embodiment, cluster inventory estimator 302 of FIG. 5 may perform flowchart 600. Further structural and operational embodiments will be apparent to persons skilled in the relevant art(s) based on the discussion regarding flowchart 600. Flowchart 600 of FIG. 6 and cluster inventory estimator 302 of FIG. 5 are described as follows.

Flowchart 600 begins with step 602. In step 602, a plurality of viewed pages is clustered into a plurality of clusters to generate a plurality of page view probability vectors. For example, in an embodiment, page view probability vector generator 506 of cluster probability vector generator 502 may be configured to cluster viewed pages indicated in previously viewed page information 124 by generating page view probability vectors 510. Example embodiments for generating page view probability vectors 510 are described as follows.

Each page view event presents a set of opportunities to serve SRT advertisements to users in a manner that is dependent on the past search activities (e.g., previously submitted search keywords) of the users. Each page viewed by a user can be represented as a bag of unique search queries performed by the same user before the page view event happens. Thus, in embodiments, page views indicated in previously viewed page information 124 may be represented by the search keywords of previously submitted search keywords 128 that were submitted by the same user that viewed the page in a prior search.

Figure 7:
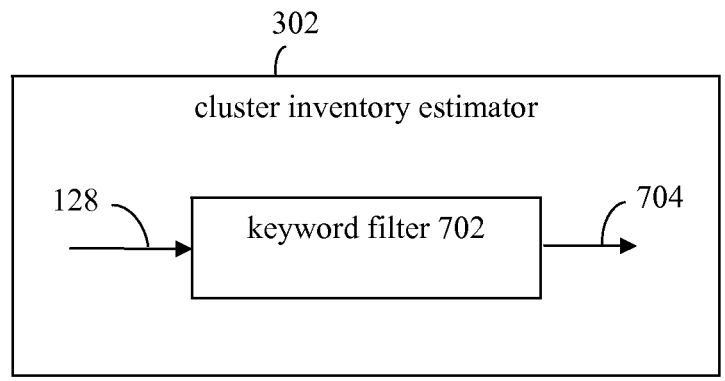
FIG. 7 shows a block diagram of a cluster inventory estimator that includes a keyword filter, according to an example embodiment.

It is noted that it may be desirable, in an embodiment, to limit the total number of previously submitted search queries that are used to represent page views (e.g., to save processing resources, to place known boundaries on the solution, etc.). Thus, in an embodiment, search keywords may optionally be filtered from previously submitted search keywords 128. For instance, FIG. 7 shows a block diagram of cluster inventory estimator 302 including a keyword filter 702, according to an example embodiment. In an embodiment, keyword filter 702 may be included in cluster inventory estimator 302 of FIG. 5. As shown in FIG. 7, keyword filter 702 receives previously submitted search keywords 128, and outputs filtered search keywords 704. Filtered search keywords 704 may be used by cluster probability vector generator 502 in FIG. 5 to generate probability vectors (rather than using previously submitted search keywords 128 directly). Keyword filter 702 is configured to limit the number of search keywords of previously submitted search keywords 128 to be included in filtered search keywords 704 in one or more ways, such a predetermined maximum number of search keywords (e.g., 100 unique search keywords, 200 unique search keywords, etc.), search keywords that were submitted in a predetermined time period (e.g., submitted during the last 7 days, the last month, etc.), and/or some other limitation on search keywords.

Furthermore, in an embodiment, keyword filter 702 may optionally apply weights to search keywords based on various factors, such as "recency" (e.g., a time when the search keyword was submitted) and/or "intensity" (e.g., number of times a search keyword appears in keywords 128). For example, search keywords in keywords 128 may have an initial weight value of 1 (or other initial value) by default. Keyword filter 702 may apply a time-decayed weight factor to the search keywords such that search keywords submitted more recently in search queries have weights that are greater than weights applied to search keywords that were submitted longer ago. Furthermore, a search keyword may be given a greater weight if the search keyword appears in search queries a greater number of times, relative to search keywords that appear a lower number of times in search queries (which are assigned less weight).

For example, if a page view event happens at time t and a search keyword appears n times, at each of times t1, t2, ... tn in previously submitted search keywords 128, a weight w may be assigned to the search keyword according to Equation 1 below:

$$w = \delta^{t-t_1} + \delta^{t-t_2} + \ldots + \delta^{t-t_n} \qquad \text{Equation 1}$$

where
t is a current time, and
δ is a decay factor, having values based on the difference between the current time t and the time at which the search keyword was submitted.

The values of decay factor δ at different times may be selected in any manner, including being determined according to an exponential time-decaying function, being accessed in a lookup table, and/or in any other manner.

In an embodiment, cluster probability vector generator 502 may optionally generate a table (e.g., stored as an array or other data structure) that organizes viewed pages and search keywords received in previously viewed page information 124 and previously submitted search keywords 128, respectively. For instance, in an embodiment, viewed pages and search keywords may be organized in a two dimensional table, with rows corresponding to the viewed pages, and columns corresponding to the search keywords, as shown below as Table 1:

TABLE 1

|  | search keyword 1 | search keyword 2 | search keyword 3 | ... |
|---|---|---|---|---|
| viewed page 1 | 1 | 0 | 1 | ... |
| viewed page 2 | 0 | 2 | 1 | ... |
| viewed page 3 | 3 | 1 | 0 | ... |
| ... | ... | ... | ... | ... |

In Table 1, each time a search query submitted by a user included a particular search keyword, and subsequently, that same user viewed a particular page, a default "1" value is added to the row-column entry for that particular search keyword and viewed page. For instance, search keyword 1 was entered by a user who subsequently accessed viewed page 1, and therefore a "1" value is present in Table 1 for the row of viewed page 1 and column of search keyword 1. Search keyword 2 was entered by two users (or the same user twice) who subsequently accessed viewed page 2, and therefore a "2" value is present in Table 1 for the row of viewed page 2 and column of search keyword 2.

As described above, keyword filter 702 may optionally apply weights to search keywords based on various factors. As such, in an embodiment, a table similar to Table 1 may be generated by cluster probability vector generator 502 that adds the weight value assigned to a search keyword submitted by a user to the row-column entry for that particular search keyword and a subsequently viewed page by the same user. For instance, Table 2 shown below is similar to Table 1 shown above, but includes weighted values based on weights applied to search keywords by keyword filter 702:

TABLE 2

|  | search keyword 1 | search keyword 2 | search keyword 3 | ... |
|---|---|---|---|---|
| viewed page 1 | 0.8 | 0 | 0.6 | ... |
| viewed page 2 | 0 | 1.9 | 0.5 | ... |
| viewed page 3 | 2.1 | 1 | 0 | ... |
| ... | ... | ... | ... | ... |

In Table 2, each time a search query submitted by a user included a particular search keyword, and subsequently, the same user viewed a particular page, the weight value for that instance of the search keyword is added to the row-column entry for that particular search keyword and viewed page. For instance, search keyword 1 was entered by a user who subsequently accessed viewed page 1. Keyword filter 702 generated a weight of 0.8 for that particular submission of search keyword 1, and therefore a "0.8" value is present in Table 2 for the row of viewed page 1 and column of search keyword 1. Search keyword 2 was entered by two users (or the same user twice) who subsequently accessed viewed page 2. Keyword filter 702 generated respective weights of 1.0 and 0.9 for those particular submissions of search keyword 2, and therefore a "1.9" value is present in Table 2 for the row of viewed page 2 and column of search keyword 2.

Note that such tables or other data structures generated/stored by cluster probability vector generator 502 may have other formats than shown above for Tables 1 and 2. Furthermore, such tables may have any size, including data for tens, hundred, thousands, millions, and even greater numbers of viewed pages (e.g., rows) and/or search keywords (e.g., columns). Such tables may be stored in storage associated with cluster inventory estimator 302, including one or more of a magnetic disc (e.g., in a hard disk drive), an optical disc (e.g., in an optical disk drive), a magnetic tape (e.g., in a tape drive), a memory device such as a RAM (random access memory) device, and/or any other suitable type of storage medium.

According to embodiments, page view probability vector generator 506 may process the information of the generated table (or other data structure) to generate a page view probability vector for each viewed page included in the table, according to step 602 of FIG. 6. As such, page view probability vector generator 506 may generate any number of page view probability vectors, including tens, hundreds, thousands, millions, and even greater numbers of page view probability vectors. Page view probability vector generator 506 may generate the page view probability vectors in any manner, including according to techniques known to persons skilled in the relevant art(s), or according to proprietary techniques. For instance, in an embodiment, page view probability vector generator 506 may apply a dimension reduction procedure to the table to generate page view probability vectors 510. Examples of such dimension reduction procedures include PLSI (probabilistic latent semantic indexing) and LDA (latent Dirichlet allocation), which are both known to persons skilled in the relevant art(s). Such dimension reduction technique is performed to co-cluster the viewed pages/search keywords of the table (e.g., the viewed page-search keyword bag) to a number of implicit clusters. As a result, each viewed page is represented as a vector of probabilities, with each probability indicating a likelihood that the viewed page belongs to a corresponding cluster. As such, each viewed page is generated a corresponding page view probability vector that includes a probability entry for each cluster.

For instance, with respect to the examples of Tables 1 and 2 shown above, page view probability vector generator 506 may generate a page view probability vector for each of viewed page 1, viewed page 2, viewed page 3, and any further included viewed pages. Examples of page view probability vectors generated for these viewed pages are shown as follows, in the example case of five clusters:

| Page View Probability Vectors | |
|---|---|
| viewed page 1 | < 0.0, 0.3, 0.9, 0.0, 0.4 > |
| viewed page 2 | < 0.7, 0.2, 0.3, 0.5, 0.2 > |
| viewed page 3 | < 0.4, 0.0, 0.0, 0.7, 0.6 > |
| ... | |

As shown in this example, each viewed page has a corresponding page view probability vector that includes five probabilities, with each probability corresponding to one of the five clusters (e.g., the probabilities are listed in cluster order, starting with the first cluster, then the second cluster, etc.). For instance, viewed page 1 has a probability of 0.0 of being included in the first cluster (of the five clusters), a probability of 0.3 of being included in the second cluster, a probability of 0.9 of being included in the third cluster, a probability of 0.0 of being included in the fourth cluster, and a probability of 0.4 of being included in the fifth cluster.

As such, in this manner, page view probability vector generator 506 may generate page view probability vectors 510 to include a plurality of page view probability vectors corresponding to the viewed pages indicated in previously viewed page information 124. Note that the number of clusters that are used to generate page view probability vectors 510 may be selected in any manner. For instance, a user of advertisement inventory estimation system 118 (FIGS. 1 and 3) may manually select the number of clusters to be used for clustering. Alternatively, the number of selected clusters may be selected automatically by cluster probability vector generator 502, such as by the dimension reduction procedure that is used, or by a clustering technique, as would be known to persons skilled in the relevant art(s) (e.g., a bisecting k-means clustering technique, etc.).

Referring back to FIG. 6, in step 604, a plurality of search keywords is clustered into the plurality of clusters to generate a plurality of keyword probability vectors. For example, in an embodiment, search keyword probability vector generator 508 of cluster probability vector generator 502 (FIG. 5) may be configured to cluster search keywords indicated in previously submitted search keywords 128 by generating search keyword probability vectors 512.

In embodiments, search keyword probability vector generator 508 may generate search keyword probability vectors 512 in any manner, including according to the techniques used by page view probability vector generator 506 to generate page view probability vectors 510. For instance, in embodiments, search keyword probability vector generator 508 may generate search keyword probability vectors 512 using dimension reduction procedures such as PLSI, LDA, or other dimension reduction procedure.

For instance, with respect to the examples of Tables 1 and 2 shown above, search keyword probability vector generator 508 may generate a search keyword probability vector for each of search keyword 1, search keyword 2, search keyword 3, and any further included search keywords. As such, search keyword probability vector generator 508 may generate any number of search keyword probability vectors, including tens, hundred, thousands, millions, and even greater numbers of search keyword probability vectors. Examples of search keyword probability vectors generated for three example search keywords are shown as follows, in the example case of five clusters:

| Search Keyword Probability Vectors | |
| --- | --- |
| Search Keyword 1 | < 0.8, 0.0, 0.0, 0.3, 0.6 > |
| Search Keyword 2 | < 0.3, 0.1, 0.8, 0.3, 0.0 > |
| Search Keyword 3 | < 0.7, 0.8, 0.0, 0.4, 0.2 > |
| ... | |

As shown in this example, each search keyword has a corresponding search keyword probability vector that includes five probabilities, with each probability corresponding to one of the five clusters. For instance, search keyword 1 has a probability of 0.8 of being included in the first cluster (of the five clusters), a probability of 0.0 of being included in the second cluster, a probability of 0.0 of being included in the third cluster, a probability of 0.3 of being included in the fourth cluster, and a probability of 0.6 of being included in the fifth cluster.

As such, in this manner, search keyword probability vector generator 508 may generate search keyword probability vectors 512 to include a plurality of search keyword probability vectors corresponding to the search keywords indicated in previously viewed page information 124 (that were not optionally filtered out by keyword filter 702).

Referring back to FIG. 6, in step 606, a plurality of total inventories is estimated that includes an estimated total inventory for each cluster of the plurality of clusters. For example, in an embodiment, cluster total inventory estimator 504 of FIG. 5 may be configured to generate an estimated total inventory for each of the clusters used in steps 602 and 604. Cluster total inventory estimator 504 may generate the estimated total inventory for each cluster in various ways, such as by addition and/or other technique, such as by techniques that take into account user factors.

For instance, in an embodiment, cluster total inventory estimator 504 may generate the estimated total inventory for each cluster by summing the probabilities included in page view probability vectors 510 for the cluster. For instance, for ease of illustration, the example page view probability vectors shown above are re-shown as follows:

| Page View Probability Vectors | |
| --- | --- |
| viewed page 1 | < 0.0, 0.3, 0.9, 0.0, 0.4 > |
| viewed page 2 | < 0.7, 0.2, 0.3, 0.5, 0.2 > |
| viewed page 3 | < 0.4, 0.0, 0.0, 0.7, 0.6 > |
| ... | |

To generate the estimated total advertisement inventory for a cluster, cluster total inventory estimator 504 may sum the probabilities generated for the cluster for all viewed pages in page view probability vectors 510. In the above example, with regard to the first cluster, cluster total inventory estimator 504 may sum together the probability of 0.0 for viewed page 1, the probability of 0.7 for viewed page 2, the probability of 0.4 for viewed page 3, and any further probabilities associated with the first cluster in page view probability vectors 510 for further viewed pages. With regard to the second cluster, cluster total inventory estimator 504 may sum together the probability of 0.3 for viewed page 1, the probability of 0.2 for viewed page 2, the probability of 0.0 for viewed page 3, and any further probabilities associated with the second cluster in page view probability vectors 510 for further viewed pages.

In this manner, cluster total inventory estimator 504 may generate the estimated total inventory for each cluster of the plurality of clusters, and may output the estimated total inventories in cluster estimated total inventories 514. For instance, continuing the current example, cluster total inventory estimator 504 may generate five estimates of total inventory corresponding to the five clusters. Example values for the total inventory estimates generated for the five clusters are shown as follows, for purposes of illustration:

| Cluster Total Inventory Estimate | |
| --- | --- |
| First Cluster | 145 |
| Second Cluster | 67 |
| Third Cluster | 158 |
| Fourth Cluster | 172 |
| Fifth Cluster | 163 |

These total inventory estimate values indicate an estimated supply of advertisement inventory for search retargeting (display advertisements shown subsequent to searches), for each page view-search keyword cluster based on the input information (search keywords and viewed pages) for display to users during a predetermined time period in web pages and/or other content published by a publisher (e.g., publisher server 116 of FIG. 1). The predetermined time period may be the same time period used for the sample of search keywords in previously submitted search keywords 128 (or time period filter used by keyword filter 702 to generate filtered search keywords 704) or may be another time period.

B. Example Embodiments for Estimating Segment Inventory

Figure 8:
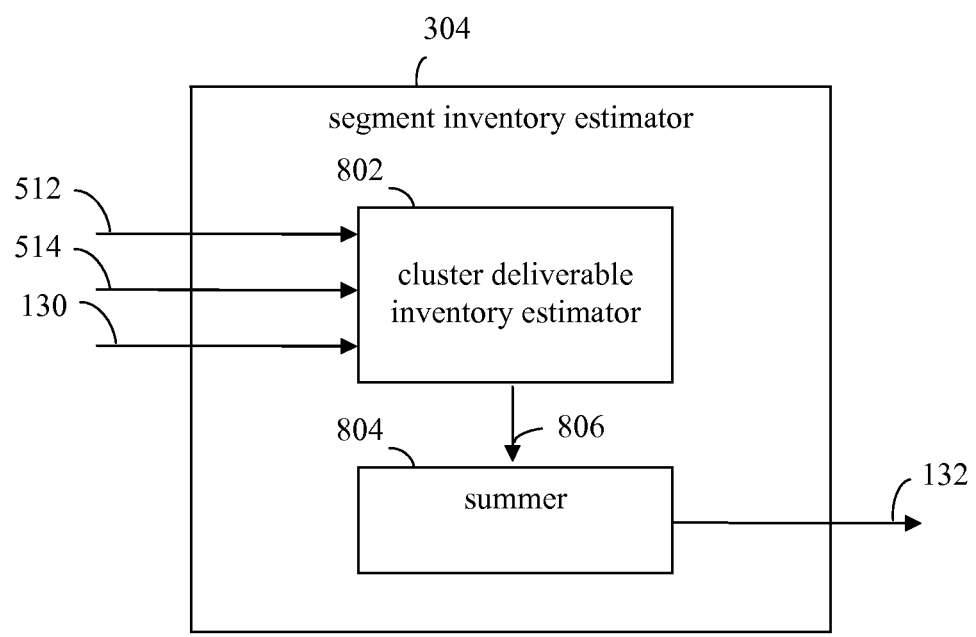
FIG. 8 shows a block diagram of a segment inventory estimator, according to an example embodiment.
Figure 9:
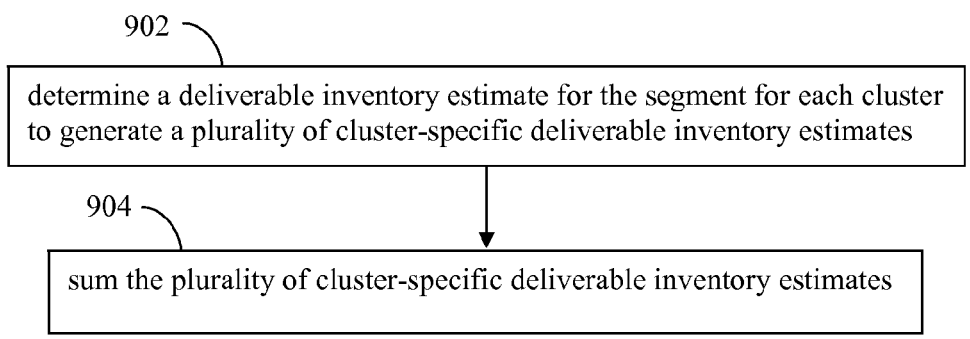
FIG. 9 shows a flowchart for estimating inventory for segments, according to an example embodiment.

Segment inventory estimator 304 may be configured in various ways to perform step 406 of FIG. 4. For instance, FIG. 8 shows a block diagram of segment inventory estimator 304, according to an example embodiment. As shown in FIG. 8, segment inventory estimator 304 includes a cluster deliverable inventory estimator 802 and a summer 804. Segment inventory estimator 304 of FIG. 8 is described as follows with respect to FIG. 9. FIG. 9 shows a flowchart 900 for estimating inventory for segments, according to an example embodiment. In an embodiment, segment inventory estimator 304 of FIG. 8 may perform flowchart 900. Further structural and operational embodiments will be apparent to persons skilled in the relevant art(s) based on the discussion regarding flowchart 900. Flowchart 900 of FIG. 9 and segment inventory estimator 304 of FIG. 8 are described as follows.

Flowchart 900 begins with step 902. In step 902, a deliverable inventory estimate is determined for the segment for each cluster to generate a plurality of cluster-specific deliverable inventory estimates. For example, as shown in FIG. 8, cluster deliverable inventory estimator 802 receives search keyword probability vectors 512, cluster estimated total inventories 514, and SRT segment 130. Cluster deliverable inventory estimator 802 is configured to determine a deliverable inventory estimate for each present cluster for SRT segment 130. In an embodiment, the estimated deliverable inventory for the segment may be generated proportionally to the sums of the probabilities for the search keywords of each cluster (included in search keyword probability vectors 512) and the estimated total inventories for the clusters (included in cluster estimated total inventories 514).

Figure 10:
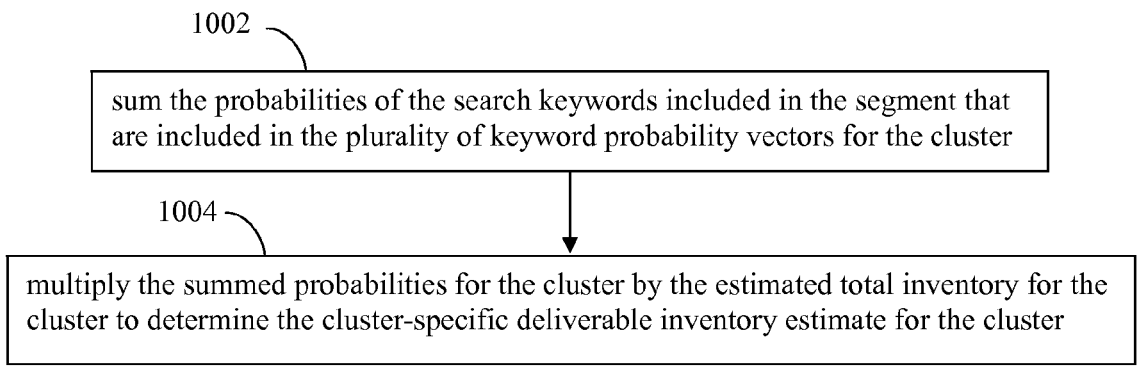
FIG. 10 shows a flowchart for determining a deliverable inventory estimate for a segment for a cluster, according to an example embodiment.

For example, in an embodiment, step 902 may be performed by cluster deliverable inventory estimator 802 according to FIG. 10. FIG. 10 shows a flowchart 1000 for determining a deliverable inventory estimate for a segment for a cluster, according to an example embodiment. In an embodiment, cluster deliverable inventory estimator 802 may perform flowchart 1000 for each cluster. Further structural and operational embodiments will be apparent to persons skilled in the relevant art(s) based on the discussion regarding flowchart 1000.

Flowchart 1000 begins with step 1002. In step 1002, the probabilities of the search keywords included in the segment that are included in the plurality of keyword probability vectors for the cluster are summed together. For example, in an embodiment, for each cluster, cluster deliverable inventory estimator 802 may be configured to sum together the probabilities for the cluster in search keyword probability vectors 512 for search keywords that are included in SRT segment 130.

For example, SRT segment 130 may include the following three search keywords:
vacation
Caribbean
Bermuda
Furthermore, search keyword probability vectors 512 may include the following four (and optionally further) search keyword vectors:

| Search Keyword | Search Keyword Probability Vectors |
|---|---|
| vacation | < 0.8, 0.0, 0.0, 0.3, 0.6 > |
| Caribbean | < 0.3, 0.1, 0.8, 0.3, 0.0 > |
| Bermuda | < 0.7, 0.8, 0.0, 0.4, 0.2 > |
| hotel | < 0.4, 0.0, 0.9, 0.2, 0.1 > |

In this example, which is provided for purposes of illustration, cluster deliverable inventory estimator 802 may generate five sums corresponding to the five clusters. Each generated sum is a sum for the cluster of the probabilities in the search keyword probability vectors for the search keywords included in SRT segment 130. In this example, the search keywords of SRT segment 130 having vectors in search keyword probability vectors 512 are "vacation," "Caribbean," and "Bermuda" (not "hotel"). As such, cluster deliverable inventory estimator 802 may generate five sums corresponding to the five clusters based on the probabilities associated with these three search keywords in search keyword probability vectors 512.

In this example, cluster deliverable inventory estimator 802 may generate a sum for the first cluster as 0.8+0.3+0.7=1.8, a sum for the second cluster as 0.0+0.1+0.8=0.9, a sum for the third cluster as 0.0+0.8+0.0=0.8, a sum for the fourth cluster as 0.3+0.3+0.4=1.0, and a sum for the fifth cluster as 0.6+0.0+0.2=0.8.

In step 1004, the summed probabilities for the cluster are multiplied by the estimated total inventory for the cluster to determine the cluster-specific deliverable inventory estimate for the cluster. For example, in an embodiment, for each cluster, cluster deliverable inventory estimator 802 may be configured to multiply the sum generated in step 1002 for the cluster by the total inventory estimate for the cluster generated in step 606 (flowchart 600 of FIG. 6).

For instance, continuing the current example, cluster deliverable inventory estimator 802 may multiply the example sums generated above for the five clusters by the example estimated total inventories generated above for the five clusters, as shown below:

| | Sum of Probabilities | Cluster Total Inventory Estimate | Cluster-Specific Deliverable Inventory Estimate |
|---|---|---|---|
| First Cluster | 1.8 | 145 | 261 |
| Second Cluster | 0.9 | 67 | 60.3 |
| Third Cluster | 0.8 | 158 | 126.4 |
| Fourth Cluster | 1.0 | 172 | 172 |
| Fifth Cluster | 0.8 | 163 | 130.4 |

As such, as shown above, a cluster-specific deliverable inventory estimate is generated for each cluster. As shown in FIG. 8, cluster deliverable inventory estimator 802 outputs cluster-specific deliverable inventory estimates 806, which includes the cluster-specific deliverable inventory estimates generated for each cluster.

Referring back to flowchart 900 in FIG. 9, in step 904, the plurality of cluster-specific deliverable inventory estimates is summed together. For instance, as shown in FIG. 8, summer 806 receives cluster-specific deliverable inventory estimates 806 generated by cluster deliverable inventory estimator 802. In an embodiment, summer 806 is configured to sum together the cluster-specific deliverable inventory estimates provided in cluster-specific deliverable inventory estimates 806 to generate deliverable inventory estimate 132.

For instance, continuing the current example, summer 804 may sum together the five cluster-specific deliverable inventory estimates generated for the five clusters. In such case, summer 804 may generate the sum of 261+60.3+126.4+172+130.4=750.1. In this example, the value of 750.1 is output in deliverable inventory estimate 132 as the estimate of deliverable advertisement inventory for SRT segment 130.

The resulting deliverable inventory estimate 132 may be transmitted to the requesting advertiser or other entity (e.g., advertiser system 120 of FIG. 1). The entity may determine whether the deliverable advertisement inventory estimate is sufficient for an advertising campaign of the advertiser associated with SRT segment 130. If the advertisement inventory estimate is not sufficient (e.g., too low or two high), the entity may modify SRT segment 130 (e.g., adding search keywords, removing search keywords, modifying search keywords, etc.), and may submit the modified SRT segment to advertisement inventory estimation system 118 to generate a corresponding new deliverable inventory estimate 132.

Example Computer Implementation

Search engine 106, advertisement inventory estimation system 118, cluster inventory estimator 302, segment inventory estimator 304, cluster probability vector generator 502, cluster total inventory estimator 504, page view probability vector generator 506, search keyword probability vector generator 508, keyword filter 702, cluster deliverable inventory estimator 802, summer 804, flowchart 400, flowchart 600, flowchart 900, flowchart 1000, and/or any further systems, sub-systems, and/or components disclosed herein may be implemented in hardware, software, firmware, or any combination thereof. For example, search engine 106, advertisement inventory estimation system 118, cluster inventory estimator 302, segment inventory estimator 304, cluster probability vector generator 502, cluster total inventory estimator 504, page view probability vector generator 506, search keyword probability vector generator 508, keyword filter 702, cluster deliverable inventory estimator 802, summer 804, flowchart 400, flowchart 600, flowchart 900, and/or flowchart 1000 may be implemented as computer program code configured to be executed in one or more processors. Alternatively, search engine 106, advertisement inventory estimation system 118, cluster inventory estimator 302, segment inventory estimator 304, cluster probability vector generator 502, cluster total inventory estimator 504, page view probability vector generator 506, search keyword probability vector generator 508, keyword filter 702, cluster deliverable inventory estimator 802, summer 804, flowchart 400, flowchart 600, flowchart 900, and/or flowchart 1000 may be implemented as hardware logic/electrical circuitry.

Figure 11:
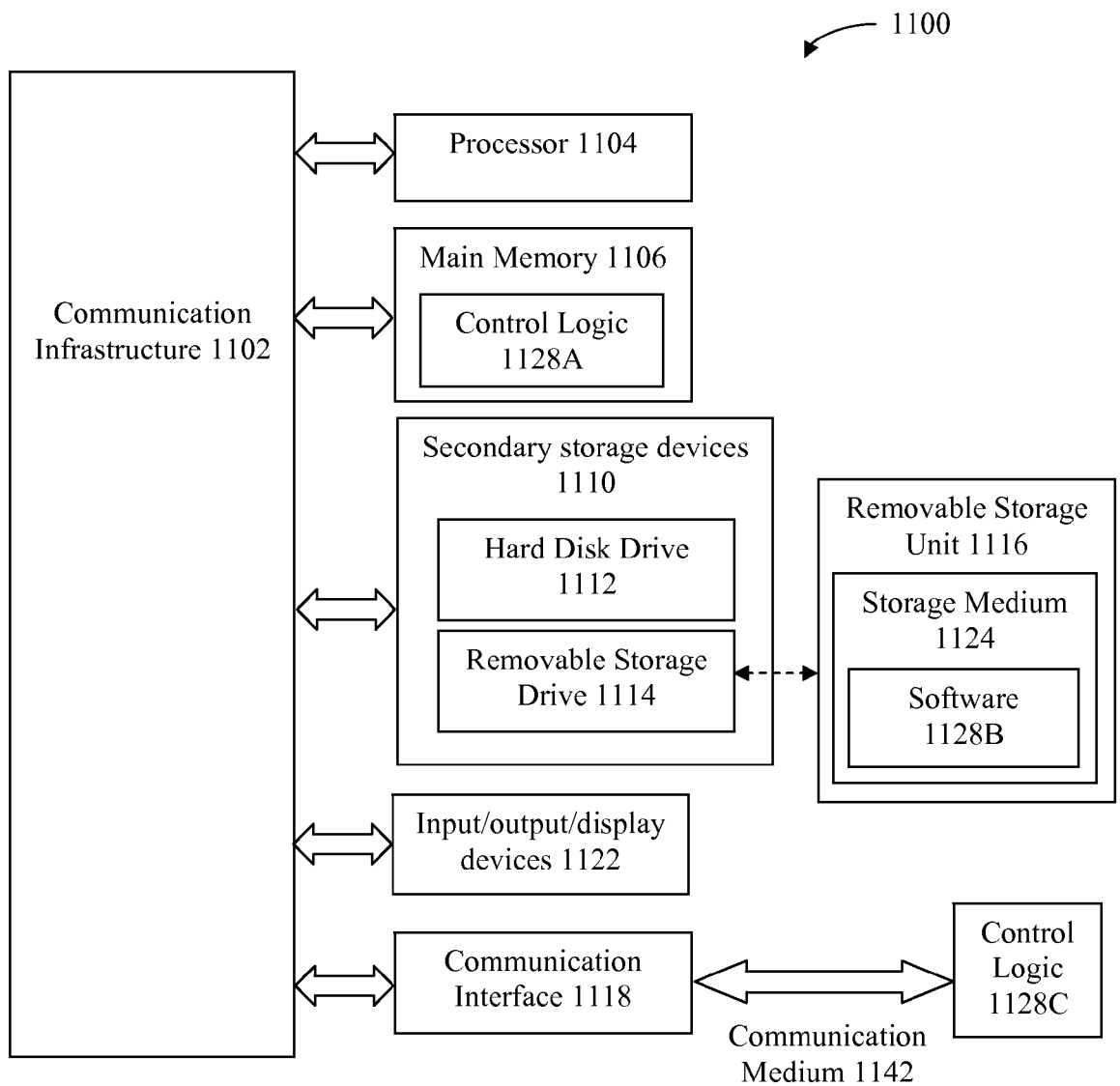
FIG. 11 shows a block diagram of an example computer system in which embodiments may be implemented.

The embodiments described herein, including systems, methods/processes, and/or apparatuses, may be implemented using well known servers/computers, such as a computer 1100 shown in FIG. 11. For example, computers 104a-104c, search engine 106, advertisement server(s) 114, publisher server(s) 116, advertisement inventory estimation system 118, and/or advertiser system 120, and any of the sub-systems or components contained therein may be implemented using one or more computers 1100.

Computer 1100 can be any commercially available and well known computer capable of performing the functions described herein, such as computers available from International Business Machines, Apple, Sun, HP, Dell, Cray, etc. Computer 1100 may be any type of computer, including a desktop computer, a server, etc.

Computer 1100 includes one or more processors (also called central processing units, or CPUs), such as a processor 1104. Processor 1104 is connected to a communication infrastructure 1102, such as a communication bus. In some embodiments, processor 1104 can simultaneously operate multiple computing threads.

Computer 1100 also includes a primary or main memory 1106, such as random access memory (RAM). Main memory 1106 has stored therein control logic 1128A (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1124 having stored therein computer software 1128B (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well known manner.

Computer 1100 also includes input/output/display devices 1122, such as monitors, keyboards, pointing devices, etc.

Computer 1100 further includes a communication or network interface 1118. Communication interface 1118 enables computer 1100 to communicate with remote devices. For example, communication interface 1118 allows computer 1100 to communicate over communication networks or mediums 1142 (representing a form of a computer useable or readable medium), such as LANs, WANs, the Internet, etc. Network interface 1118 may interface with remote sites or networks via wired or wireless connections.

Control logic 1128C may be transmitted to and from computer 1100 via the communication medium 1142.

Any apparatus or manufacture comprising a computer useable or readable medium having control logic (software) stored therein is referred to herein as a computer program product or program storage device. This includes, but is not limited to, computer 1100, main memory 1106, secondary storage devices 1110, and removable storage unit 1116. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for implementing the features of search engine 106, advertisement inventory estimation system 118, cluster inventory estimator 302, segment inventory estimator 304, cluster probability vector generator 502, cluster total inventory estimator 504, page view probability vector generator 506, search keyword probability vector generator 508, keyword filter 702, cluster deliverable inventory estimator 802, summer 804, flowchart 400, flowchart 600, flowchart 900, and/or flowchart 1000 (including any step of flowcharts 400, 600, 900, and 1000), and/or further embodiments described herein. Embodiments of the invention are directed to computer program products comprising such logic (e.g., in the form of program code or software) stored on any computer useable medium. Such program code, when executed in one or more processors, causes a device to operate as described herein.

Note that such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for estimating advertisement inventory, comprising:
   clustering, using a processor, a plurality of viewed pages into a plurality of clusters to generate a plurality of page view probability vectors that includes a page view probability vector for each viewed page, said clustering based on a frequency of search keywords present in the viewed pages;
   clustering by the processor, a plurality of search keywords into the plurality of clusters to generate a plurality of keyword probability vectors that includes a keyword probability vector for each search keyword, the search keywords based on search keywords previously submitted by a plurality of users, and the plurality of viewed pages including previously viewed pages corresponding to the previously submitted search keywords;
   clustering the plurality of viewed pages into a plurality of clusters based on a time-decaying weighted frequency of the search keywords and an intensity value of the search keywords, present in the viewed pages; and
   estimating by the processor, a plurality of total inventories that includes an estimated total inventory for each cluster of the plurality of clusters.

2. The method of claim 1, wherein said clustering the plurality of viewed pages into a plurality of clusters based on a frequency of search keywords present in the viewed pages comprises:
   clustering the plurality of viewed pages into a plurality of clusters based on a time-decaying weighted frequency of search keywords present in the viewed pages.

3. The method of claim 1, further comprising:
   limiting the plurality of search keywords to at least one of a predetermined maximum number of search keywords or search keywords submitted in a predetermined time period.

4. The method of claim 1, wherein said estimating a total inventory for each cluster of the plurality of clusters comprises:
   for each cluster, summing the probabilities included in the plurality of page view probability vectors for the cluster to generate the estimated total inventory for the cluster.

5. The method of claim 1, further comprising:
   receiving a search retargeting segment that includes a set of search keywords; and
   estimating a deliverable inventory for the segment.

6. The method of claim 5, wherein said estimating a deliverable inventory for the segment comprises:
   determining a deliverable inventory estimate for the segment for each cluster to generate a plurality of cluster-specific deliverable inventory estimates; and
   summing the plurality of cluster-specific deliverable inventory estimates.

7. The method of claim 6, wherein said determining a deliverable inventory estimate for the segment for each cluster to generate a plurality of cluster-specific deliverable inventory estimates comprises:
   for each cluster,
   summing the probabilities of the search keywords included in the segment that are included in the plurality of keyword probability vectors for the cluster, and
   multiplying the summed probabilities for the cluster by the estimated total inventory for the cluster to determine the cluster-specific deliverable inventory estimate for the cluster.

8. A method for estimating advertisement inventory, comprising:
   receiving, by a processor, a search retargeting segment that includes a set of search keywords;
   clustering, using a processor, a plurality of viewed pages into a plurality of clusters to generate a plurality of page view probability vectors that includes a page view probability vector for each viewed page, said clustering based on a frequency of search keywords present in the viewed pages, the search keywords based on keywords previously submitted by a plurality of users, and the plurality of view pages including previously viewed pages corresponding to the previously submitted keywords;
   clustering the plurality of viewed pages into a plurality of clusters based on a time-decaying weighted frequency of the search keywords and an intensity value of the keywords, present in the viewed pages; and
   estimating, using the processor, a deliverable inventory for the segment.

9. The method of claim 8, wherein said estimating a deliverable inventory for the segment comprises:
  receiving an indication of a plurality of clusters;
  receiving a plurality of page view probability vectors that includes a page view probability vector for each viewed page of a plurality of previously viewed pages, each page view probability vector indicating probabilities of a corresponding viewed page being included in each of the clusters;
  determining a deliverable inventory estimate for the segment for each cluster to generate a plurality of cluster-specific deliverable inventory estimates; and
  summing the plurality of cluster-specific deliverable inventory estimates.

10. The method of claim 9, wherein said determining a deliverable inventory estimate for the segment for each cluster to generate a plurality of cluster-specific deliverable inventory estimates comprises:
  receiving a plurality of keyword probability vectors that includes a keyword probability vector for each of a plurality of previously submitted search keywords, each keyword probability vector indicating probabilities of a corresponding keyword being included in each of the clusters; and
  for each cluster,
    summing the probabilities of the search keywords included in the segment that are included in the plurality of keyword probability vectors for the cluster, and
    multiplying the summed probabilities for the cluster by the estimated total inventory for the cluster to determine the cluster-specific deliverable inventory estimate for the cluster.

11. A system for estimating advertisement inventory, stored in a non-transitory medium executable by a processor, comprising:
  a cluster probability vector processor configured to cluster a plurality of viewed pages into a plurality of clusters to generate a plurality of page view probability vectors that includes a page view probability vector for each viewed page, said clustering based on a frequency of search keywords present in the viewed pages;
  the cluster probability vector processor configured to cluster a plurality of search keywords into the plurality of clusters to generate a plurality of keyword probability vectors that includes a keyword probability vector for each search keyword, the search keywords based on search keywords previously submitted by a plurality of users, and the plurality of view pages including previously viewed pages corresponding to the previously submitted search keywords;
  clustering the plurality of viewed pages into a plurality of clusters based on a time-decaying weighted frequency of the search keywords and an intensity value of the search keywords, present in the viewed pages; and
  a cluster total inventory estimation processor configured to estimate a plurality of total inventories that includes an estimated total inventory for each cluster of the plurality of clusters.

12. The system of claim 11, wherein the cluster probability vector generator is configured to cluster the plurality of viewed pages into a plurality of clusters based on a time-decaying weighted frequency of search keywords present in the viewed pages.

13. The system of claim 11, further comprising:
  a keyword filter configured to limit the plurality of search keywords to at least one of a predetermined maximum number of search keywords or search keywords submitted in a predetermined time period.

14. The system of claim 11, wherein for each cluster, the cluster total inventory estimator sums the probabilities included in the plurality of page view probability vectors for the cluster to generate the estimated total inventory for the cluster.

15. The system of claim 11, further comprising:
  a segment inventory estimator that receives a search retargeting segment that includes a set of search keywords, and estimates a deliverable inventory for the segment.

16. The system of claim 15, wherein the segment inventory estimator comprises:
  a cluster deliverable inventory estimator that determines a deliverable inventory estimate for the segment for each cluster to generate a plurality of cluster-specific deliverable inventory estimates; and a summer that sums the plurality of cluster-specific deliverable inventory estimates to generate the estimate of the deliverable inventory for the segment.

17. The system of claim 16, wherein for each cluster, the cluster deliverable inventory estimator sums the probabilities of the search keywords included in the segment that are included in the plurality of keyword probability vectors for the cluster, and multiplies the summed probabilities for the cluster by the estimated total inventory for the cluster to determine the cluster-specific deliverable inventory estimate for the cluster.

* * * * *